United States Patent
Fleureau et al.

(10) Patent No.: US 10,818,020 B2
(45) Date of Patent: Oct. 27, 2020

(54) APPARATUS AND A METHOD FOR OBTAINING A REGISTRATION ERROR MAP REPRESENTING A LEVEL OF SHARPNESS OF AN IMAGE

(71) Applicant: INTERDIGITAL CE PATENT HOLDINGS, Paris (FR)

(72) Inventors: Julien Fleureau, Rennes (FR); Pierre Hellier, Thorigné Fouillard (FR); Benoit Vandame, Betton (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 219 days.

(21) Appl. No.: 15/737,301

(22) PCT Filed: Jun. 16, 2016

(86) PCT No.: PCT/EP2016/063937
§ 371 (c)(1),
(2) Date: Dec. 17, 2017

(87) PCT Pub. No.: WO2016/202946
PCT Pub. Date: Dec. 22, 2016

(65) Prior Publication Data
US 2018/0189965 A1      Jul. 5, 2018

(30) Foreign Application Priority Data
Jun. 17, 2015   (EP) .................... 15305939

(51) Int. Cl.
*G06K 9/00*      (2006.01)
*G06T 7/33*      (2017.01)
(Continued)

(52) U.S. Cl.
CPC .......... *G06T 7/337* (2017.01); *G02B 27/0075* (2013.01); *G06T 7/001* (2013.01);
(Continued)

(58) Field of Classification Search
CPC .......... G06T 7/337; G06T 7/001; G06T 7/90; G06T 7/74; G06T 2207/10052;
(Continued)

(56) References Cited

U.S. PATENT DOCUMENTS

2007/0122007 A1    5/2007  Austin et al.
2009/0310885 A1   12/2009  Tamaru
(Continued)

FOREIGN PATENT DOCUMENTS

CN    103366356    10/2013
EP       2403234     1/2012
(Continued)

OTHER PUBLICATIONS

Mousnier et al., "Partial Light Field Tomographic Reconstruction From a Fixed-Camera Focal Stack", Cornell University Library, Computer Science, Computer Vision and Pattern Recognition, Document arXiv: 1503.01903 [cs.CV],Mar. 6, 2015, pp. 1-10. (Year: 2015).*
(Continued)

*Primary Examiner* — Van D Huynh
(74) *Attorney, Agent, or Firm* — Lily Neff

(57) ABSTRACT

The present invention generally relates to an apparatus and a method for obtaining a registration error map representing a level of sharpness of an image. Many methods are known which allow determining the position of a camera with respect to an object, based on the knowledge of a 3D model of the object and the intrinsic parameters of the camera.
(Continued)

However, regardless of the visual servoing technique used, there is no control in the image space and the object may get out of the camera field of view during servoing. It is proposed to obtain a registration error map relating to an image of the object of interest generated by computing an intersection of a re-focusing surface obtained from a 3D model of said object of interest and a focal stack based on acquired four-dimensional light-field data relating to said object of interest.

11 Claims, 5 Drawing Sheets

(51) Int. Cl.
G02B 27/00 (2006.01)
H04N 5/225 (2006.01)
G06T 7/00 (2017.01)
G06T 7/70 (2017.01)
H04N 13/232 (2018.01)
G06T 7/73 (2017.01)
G06T 7/90 (2017.01)
H04N 13/00 (2018.01)

(52) U.S. Cl.
CPC .............. *G06T 7/0002* (2013.01); *G06T 7/70* (2017.01); *G06T 7/74* (2017.01); *G06T 7/90* (2017.01); *H04N 5/2254* (2013.01); *H04N 13/232* (2018.05); G06T 2200/21 (2013.01); G06T 2207/10028 (2013.01); G06T 2207/10052 (2013.01); G06T 2207/30108 (2013.01); G06T 2207/30244 (2013.01); H04N 2013/0081 (2013.01)

(58) Field of Classification Search
CPC ......... G06T 7/0002; G06T 2207/30244; G06T 2207/30108; G06T 2207/10028; G06T 2200/21; G06T 7/70; G06T 7/557; G06T 7/571; H04N 5/2254; H04N 2013/0081; H04N 13/232; H04N 13/239; H04N 13/236; G02B 27/0075
USPC ........................................................ 382/103
See application file for complete search history.

(56) References Cited

U.S. PATENT DOCUMENTS

| | | | |
|---|---|---|---|
| 2011/0032337 A1* | 2/2011 | Rodriguez Ramos | G06T 7/557 348/49 |
| 2012/0057040 A1 | 3/2012 | Park et al. | |
| 2012/0194644 A1 | 8/2012 | Newcombe et al. | |
| 2013/0088489 A1* | 4/2013 | Schmeitz | H04N 5/2254 345/419 |
| 2013/0169754 A1 | 7/2013 | Aronsson et al. | |
| 2014/0098191 A1 | 4/2014 | Rime et al. | |
| 2014/0219576 A1 | 8/2014 | Yokoyama | |
| 2015/0206289 A1* | 7/2015 | Wang | G06T 5/50 348/208.6 |

FOREIGN PATENT DOCUMENTS

| | | |
|---|---|---|
| JP | 2007508609 A | 4/2007 |
| JP | 2010020758 A | 1/2010 |
| JP | 2011022796 A | 2/2011 |
| JP | 2014511591 A | 5/2014 |
| JP | 2014150466 A | 8/2014 |
| WO | WO2013186056 | 12/2013 |

OTHER PUBLICATIONS

Mousnier et al., "Partial Light Field Tomographic Reconstruction From a Fixed-Camera Focal Stack", Cornell University Library, Computer Science, Computer Vision and Pattern Recognition, Document arXiv: 1503.01903 [cs.CV],Mar. 6, 2015, pp. 1-10. (Year: 2015) (Year: 2015).*

Mousnier et al., "Partial Light Field Tomographic Reconstruction From a Fixed-Camera Focal Stack", Cornell University Library, Computer Science, Computer Vision and Pattern Recognition, Document arXiv:1503.01903 [cs.CV], Mar. 6, 2015, pp. 1-10.

Mekki et al., "Path Planning for 3D Visual Servoing: for a Wheeled mobileRobot", IEEE 2013 International Conference on Individual and Collective Behaviours in Robotics (ICBR), Sousse, Tunisia, Dec. 15, 2013, pp. 86-91.

Senthilnathan et al., "Non-Metrical Scene Reconstruction Using a Quasi-Calibrated Prime Lens Based Camera", IEEE 2011 International Conference on Image Information Processing (ICIIP), Shimia, India, Nov. 3, 2011, pp. 1-7.

Park et al., "Novel Position-Based Visual Servoing Approach to Robust Global Stability Under Field-of-View Constraint", IEEE Transactions on Industrial Electronics, vol. 59, No. 12, Dec. 2012, pp. 4735-4752.

* cited by examiner

| 0 | 0 | 0 | 0 | 0 | 0 | 0 |
|---|---|---|---|---|---|---|
| 0 | 1 | 1 | 1 | 1 | 1 | 0 |
| 0 | 1 | 1 | 1 | 1 | 1 | 0 |
| 0 | 1 | 1 | 1 | 1 | 1 | 0 |
| 0 | 1 | 1 | 1 | 1 | 1 | 0 |
| 0 | 0 | 0 | 0 | 0 | 0 | 0 |

| 1 | 1 | 0,75 | 0,75 | 0,5 | 0 | 0 |
|---|---|---|---|---|---|---|
| 1 | 1 | 0,75 | 0,5 | 0,5 | 0 | 0 |
| 1 | 0,75 | 1 | 0,75 | 0,25 | 0 | 0 |
| 0,75 | 0,75 | 0,75 | 0,5 | 0,25 | 0 | 0 |
| 0,5 | 0,5 | 0,5 | 0,25 | 0 | 0,25 | 0,25 |
| 0,25 | 0 | 0 | 0 | 0 | 0 | 0,25 |

Fig. 9

APPARATUS AND A METHOD FOR OBTAINING A REGISTRATION ERROR MAP REPRESENTING A LEVEL OF SHARPNESS OF AN IMAGE

This application claims the benefit, under 35 U.S.C. § 365 of International Application PCT/EP2016/063937, filed Jun. 16, 2016, which was published in accordance with PCT Article 21(2) on Dec. 22, 2016, in English, and which claims the benefit of European Application No. 15305939.9 filed Jun. 17, 2015.

TECHNICAL FIELD

The present disclosure generally relates to an apparatus and a method for obtaining a registration error map from four-dimensional light-field data, such a registration error map may be used in visual servoing applications such as visual guidance or quality control of surfaces.

BACKGROUND

Visual servoing is a technique which uses visual feedback information to control the motion of an end-user such as a robot, or in some cases a human being. This visual feedback information is received from a vision sensor, such as a camera, connected to or embedded in the robot, or displayed on a screen of a device belonging to the end-user such as a mobile phone or a tablet.

As disclosed in "*Path Planning for 3D Visual Servoing: for a Wheeled mobile Robot*", H. Mekki & M. Letaiel, IEEE 2013 International Conference on Individual and Collective Behaviours in Robotics; there are two approaches in visual servoing, the first one is Image-Based Control or IBC and the second one is Position-Based Control or PBC.

In IBC, visual feedback is directly defined in the image. However, IBC suffers from stability and convergence problems.

In PBC, also called 3D visual servoing, a control error function is computed in the Cartesian space and image features are extracted from the image. A perfect model of the target is used in order to determine the position of the target with respect to the camera frame. Many methods are known which allow determining the position of the camera with respect to the target, based on the knowledge of a 3D or 2D model of the target and the intrinsic parameters of the camera. These methods use visual information of different nature such as points, lines, etc.

However, regardless of the visual servoing technique, whether IBC or PBC, there is no control in the image space and the object may get out of the camera field of view during servoing, making it difficult to determine the relative pose of the camera and the object.

SUMMARY OF DISCLOSURE

According to a first aspect of the invention there is provided an apparatus for obtaining a map representing a level of sharpness of a plurality of pixels of an image, called registration error map, comprising a processor configured to obtain a registration error map relating to an image of an object of interest generated by computing an intersection of a re-focusing surface obtained from a three-dimensional model of said object of interest and a focal stack based on acquired four-dimensional light-field data relating to said object of interest.

According to an embodiment of the invention, the processor is configured to determine the re-focusing surface by computing a distance map of the three-dimensional model of the object of interest when set in a reference position.

According to an embodiment of the invention, the processor is configured to compute an intersection of the re-focusing surface and the focal stack by determining for each pixel of the image to be re-focused a re-focusing distance corresponding to one of the images constituting the focal stack from the predefined re-focusing surface.

According to an embodiment of the invention, the processor is configured to generate an appearance of the registration error map to be displayed based on information relating to a level of sharpness of the pixels of the re-focused image.

According to an embodiment of the invention, the processor is configured to display the obtained registration error map on a display device of the apparatus.

Another aspect of the invention concerns a method for obtaining a map representing a level of sharpness of a plurality of pixels of an image, called registration error map, the method comprising obtaining a registration error map relating to an image of an object of interest generated by computing an intersection of a re-focusing surface obtained from a three-dimensional model of said object of interest and a focal stack based on acquired four-dimensional light-field data relating to said object of interest.

According to an embodiment of the invention, determining the re-focusing surface comprises computing a distance map of the three-dimensional model of the object of interest when set in a reference position.

According to an embodiment of the invention, computing an intersection of the re-focusing surface and the focal stack comprises determining for each pixel of the image to be re-focused a re-focusing distance corresponding to one of the images constituting the focal stack from the re-focusing surface.

According to an embodiment of the invention, the method comprises generating an appearance of the registration error map to be displayed based on information relating to a level of sharpness of the pixels of the re-focused image.

According to an embodiment of the invention, the method comprises displaying the obtained registration error map on a display device.

Some processes implemented by elements of the disclosure may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since elements of the present disclosure can be implemented in software, the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

The object and advantages of the present disclosure will be realized and attained by means of the elements and combinations particularly pointed out in the claims.

It is to be understood that both the foregoing general description and the following description are exemplary and explanatory and are not restrictive of the invention as claimed.

BRIEF DESCRIPTION OF THE DRAWINGS

FIG. 9 represents a registration error map according to an embodiment of the disclosure.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium(a) may be utilized.

A plenoptic camera is able to measure the amount of light traveling along each bundle of rays that intersects a sensor, by arranging a microlens array between a main lens and the sensor. The data acquired by such a camera are called light-field data. These light-field data can be post-processed to reconstruct images of a scene from different viewpoints. The light-field data can be used to generate a focal stack which comprises a collection of images each having different re-focusing depth. As a result, a user can change a focal point of the images. Compared to a conventional camera, the plenoptic camera can obtain additional optical information components for achieving the reconstruction of the images of a scene from the different viewpoints and re-focusing depth by post-processing.

Thus, it is possible to use these specificities of light-field data in the context of visual servoing and visual guidance where any additional information helping in finding the right position in regard of an object of interest is useful.

Figure 1A:
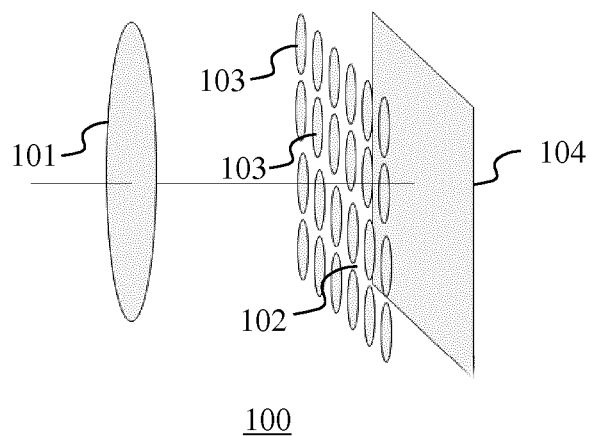
FIG. 1A schematically represents a plenoptic camera.

FIG. 1A is a diagram schematically representing a plenoptic camera 100. Light-field cameras are capable of recording four-dimensional (or 4D) light-field data. The plenoptic camera 100 comprises a main lens 101, a microlens array 102 and an image sensor 104.

Figure 1B:
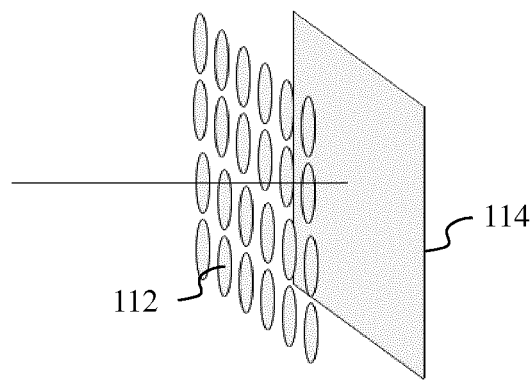
FIG. 1B represents a multi-array camera.

FIG. 1B represents a multi-array camera 110. The multi-array camera 110 comprises a lens array 112 and an image sensor 114.

In the example of the plenoptic camera 100 as shown in FIG. 1A, the main lens 101 receives light from an object (not shown on the figure) in an object field of the main lens 101 and passes the light through an image field of the main lens 101. The microlens array 102 includes a plurality of microlenses 103 arranged in a two-dimensional array.

Data captured by a light-field camera can be post-processed to reconstruct images of a scene from different points of view. Since a light-field camera is capable of capturing a collection of partial views of a same scene from slightly changed point of views, it is possible to create an image with a customized focus plane by combining those different partial views.

Figure 2:
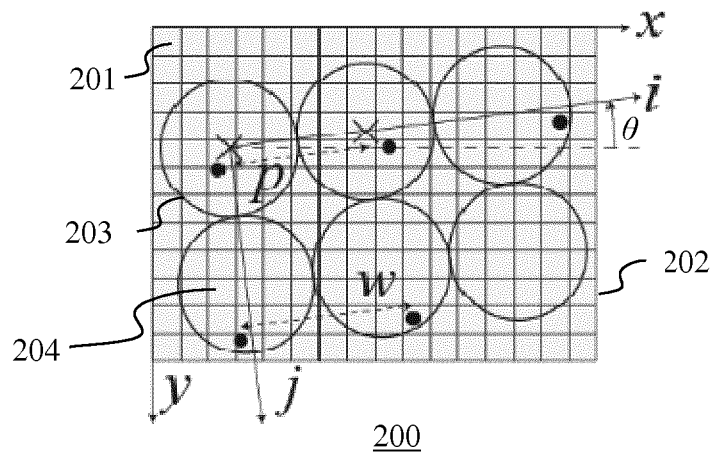
FIG. 2 schematically illustrates a plan view of sensor regions arranged on the sensing surface of an image sensor of a light-field camera.

FIG. 2 is a plan view schematically illustrating an example of sensor regions arranged on the sensing surface of an image sensor of a light-field camera. As illustrated in FIG. 2, the image sensor 200 includes a plurality of pixels 201 arranged in a two-dimensional array, and receives the light from the object through the microlens array 202. Each of the microlenses 203 of the microlens array 202 has the lens properties to direct the light to a circular area 204 on the image sensor 200. An outer contour of the circular area 204 may represent the shape of a microlens image formed and captured on the image sensor 200, which shape depends on the shape of the microlens 203. Amongst all of the pixels 201 on the image sensor 200, only the pixels 201 located substantially inside the circular area 204 contribute to the imaging. In other words, a pixel area (or sensing area) of each pixel 201 that contributes to the imaging is located substantially inside the circular area 204.

The image sensor 200 of a light-field camera records an image comprising a collection of two-dimensional (or 2D) microlens images arranged within a 2D image. Each microlens 203 of the microlens array 202 forms a microlens image represented by a circular area 204. Coordinates of pixels 201 on the sensor 200 are indicated by an ordered pair (x,y) in a x-y coordinate system on the surface of the image sensor 200 as shown in FIG. 2. A distance p is the distance between two consecutive microlens images. Microlenses 203 are chosen such that the distance p is larger than the size of a pixel 201. A distance w is the disparity distance between two consecutive microlens images. Microlens images are referred by their respective coordinates (i,j) in a i-j coordinate system on the surface of the image sensor 200 as shown in FIG. 2.

As mentioned above, only the pixels 201 located substantially inside the circular area 204 receive the light through a microlens 203. The inter microlens space may be masked out to prevent photons to pass outside a microlens 203. If the microlenses 203 have a square shape and the inter microlens space is not formed, such a masking is not needed.

The center of a microlens image (i,j) is located on the image sensor 200 at the coordinate $(x_{i,j}, y_{i,j})$ in the x-y coordinate system. A θ represents an angle between the square lattice of pixels 201 and the square lattice of microlenses 204. The coordinates $(x_{i,j}, y_{i,j})$ of the center of the microlens image can be deduced by the following equation (1) considering $(x_{0,0}, y_{0,0})$ as the pixel coordinate of the microlens image (0,0):

$$\begin{bmatrix} x_{i,j} \\ y_{i,j} \end{bmatrix} = p \begin{bmatrix} \cos\theta & -\sin\theta \\ \sin\theta & \cos\theta \end{bmatrix} \begin{bmatrix} i \\ j \end{bmatrix} + \begin{bmatrix} x_{0,0} \\ y_{0,0} \end{bmatrix} \quad (1)$$

The distances p and w are given in unit of pixel. They are converted into physical unit of distance, for example meters, P and W, respectively, by multiplying the pixel size δ in meters: W=δw and P=δp. These distances depend on the characteristics of the light-field camera.

Figure 3:
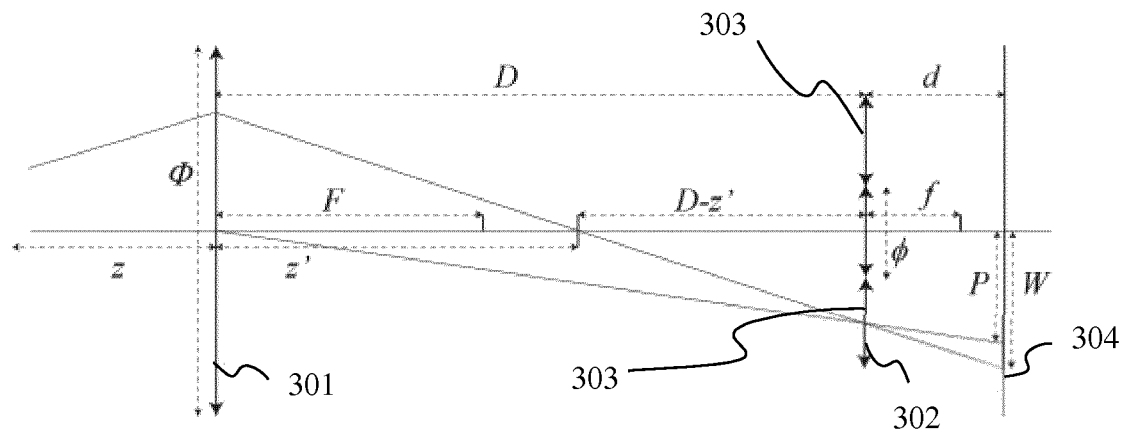
FIG. 3 illustrates a schematic light-field camera comprising an ideal, perfect thin lens model.

Here, exemplary optical properties of a light-field camera will be discussed with reference to FIG. 3 which illustrates a schematic light-field camera comprising an ideal, perfect thin lens model.

The main lens 301 has a focal length F and an aperture Φ. The microlens array 302 comprises microlenses 303 having a focal length f. The pitch of the microlens array 302 is φ. The microlens array 302 is located at a distance D from the main lens 301 and at a distance d from the sensor 304. An object (not shown on the figure) is located at a distance z from the main lens 301. This object is focused by the main lens 301 at a distance z′ from the main lens 301. FIG. 3 illustrates the case where D>z′. In this case, microlens images can be in-focus on the sensor 304 depending on d and f.

The disparity W varies with the distance z between the object and the main lens 301. The establishment of the relation between W and z relies on the thin lens equation (2) and the Thales law equation (3):

$$\frac{1}{z} + \frac{1}{z'} = \frac{1}{F} \quad (2)$$

$$\frac{D-z'}{\phi} = \frac{D-z'+d}{W} \quad (3)$$

Then, the following equation (4) is deduced by mixing the equations (2) and (3).

$$W = \phi \left( 1 + \frac{d}{D - \frac{zF}{z-F}} \right) \quad (4)$$

The relation between W and z are not on the assumption that the microlens images are in-focus. Microlens images are strictly in-focus according to the thin lens equation:

$$\frac{1}{D-z'} + \frac{1}{d} = \frac{1}{f} \quad (5)$$

A major property of a light-field camera is the possibility to compute 2D re-focused images where the re-focalization distance is freely adjustable after the shot of the images.

A 4D light-field image L of size $[N_x, N_y]$, where $N_x$ and $N_y$ represent the number of pixels along the x-axis and the y-axis respectively, is projected into a 2D image by shifting and zooming microlens images and then summing them into a 2D image. The amount of shift of the microlens images controls the re-focalization distance. The projection of a pixel of coordinates (x,y,i,j) in the 4D light-field image L into the re-focused 2D image coordinate (X,Y) is defined by:

$$\begin{bmatrix} X \\ Y \end{bmatrix} = sg\left( \begin{bmatrix} x \\ y \end{bmatrix} - \begin{bmatrix} x_{i,j} \\ y_{i,j} \end{bmatrix} \right) + s \begin{bmatrix} x_{i,j} \\ y_{i,j} \end{bmatrix} \quad (6)$$

where s controls the size of the 2D re-focused image, and g controls the focalization distance of the re-focused image. This equation (6) can be rewritten as equation (7) by considering equation (1):

$$\begin{bmatrix} X \\ Y \end{bmatrix} = sg\begin{bmatrix} x \\ y \end{bmatrix} + sp(1-g)\begin{bmatrix} \cos\theta & -\sin\theta \\ \sin\theta & \cos\theta \end{bmatrix}\begin{bmatrix} i \\ j \end{bmatrix} + s(1-g)\begin{bmatrix} x_{0,0} \\ y_{0,0} \end{bmatrix} \quad (7)$$

The parameter g can be expressed as function of p and w as in equation (8). The parameter g represents the zoom that must be performed on the microlens images, using their centers as reference, such that the various zoomed views of the same objects get superposed.

$$g = \frac{p}{p-w} \quad (8)$$

Equation (7) becomes:

$$\begin{bmatrix} X \\ Y \end{bmatrix} = sg\begin{bmatrix} x \\ y \end{bmatrix} - sgw\begin{bmatrix} \cos\theta & -\sin\theta \\ \sin\theta & \cos\theta \end{bmatrix}\begin{bmatrix} i \\ j \end{bmatrix} + \frac{sgw}{p}\begin{bmatrix} x_{0,0} \\ y_{0,0} \end{bmatrix} \quad (9)$$

Figure 4:
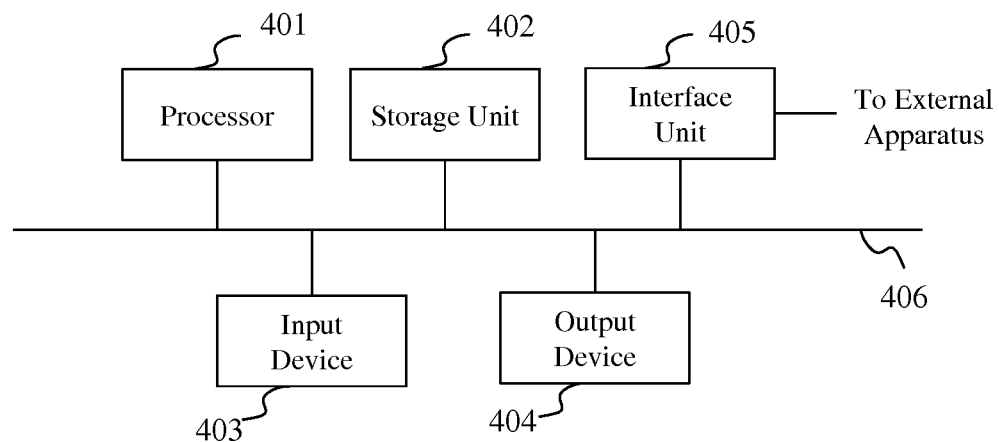
FIG. 4 is a schematic block diagram illustrating an example of an apparatus for obtaining a registration error map representing a level of fuzziness of an image according to an embodiment of the present disclosure.

FIG. 4 is a schematic block diagram illustrating an example of an apparatus for obtaining a registration error map representing a level of fuzziness of an image according to an embodiment of the present disclosure.

The apparatus 400 comprises a processor 401, a storage unit 402, an input device 403, a display device 404, and an interface unit 405 which are connected by a bus 406. Of course, constituent elements of the computer apparatus 400 may be connected by a connection other than a bus connection.

The processor 401 controls operations of the apparatus 400. The storage unit 402 stores at least one program to be executed by the processor 401, and various data, including data of 4D light-field images captured and provided by a light-field camera, parameters used by computations performed by the processor 401, intermediate data of computations performed by the processor 401, and so on. The processor 401 may be formed by any known and suitable hardware, or software, or a combination of hardware and software. For example, the processor 401 may be formed by dedicated hardware such as a processing circuit, or by a programmable processing unit such as a CPU (Central Processing Unit) that executes a program stored in a memory thereof.

The storage unit 402 may be formed by any suitable storage or means capable of storing the program, data, or the like in a computer-readable manner. Examples of the storage unit 402 include non-transitory computer-readable storage media such as semiconductor memory devices, and magnetic, optical, or magneto-optical recording media loaded into a read and write unit. The program causes the processor 401 to perform a process for obtaining a registration error map representing a level of fuzziness of an image according to an embodiment of the present disclosure as described hereinafter with reference to FIG. 5.

The input device 403 may be formed by a keyboard, a pointing device such as a mouse, or the like for use by the user to input commands, to make user's selections of three-dimensional (or 3D) models of an object of interest use to define a re-focusing surface. The output device 404 may be formed by a display device to display, for example, a Graphical User Interface (GUI), images generated according to an embodiment of the present disclosure. The input device 403 and the output device 404 may be formed integrally by a touchscreen panel, for example.

The interface unit 405 provides an interface between the apparatus 400 and an external apparatus. The interface unit 405 may be communicable with the external apparatus via cable or wireless communication. In an embodiment, the external apparatus may be a light-field camera. In this case, data of 4D light-field images captured by the light-field camera can be input from the light-field camera to the apparatus 400 through the interface unit 405, then stored in the storage unit 402.

In this embodiment the apparatus 400 is exemplary discussed as it is separated from the light-field camera and they are communicable each other via cable or wireless communication, however it should be noted that the apparatus 400 can be integrated with such a light-field camera. In this later case, the apparatus 400 may be for example a portable device such as a tablet or a smartphone embedding a light-field camera.

Figure 5:
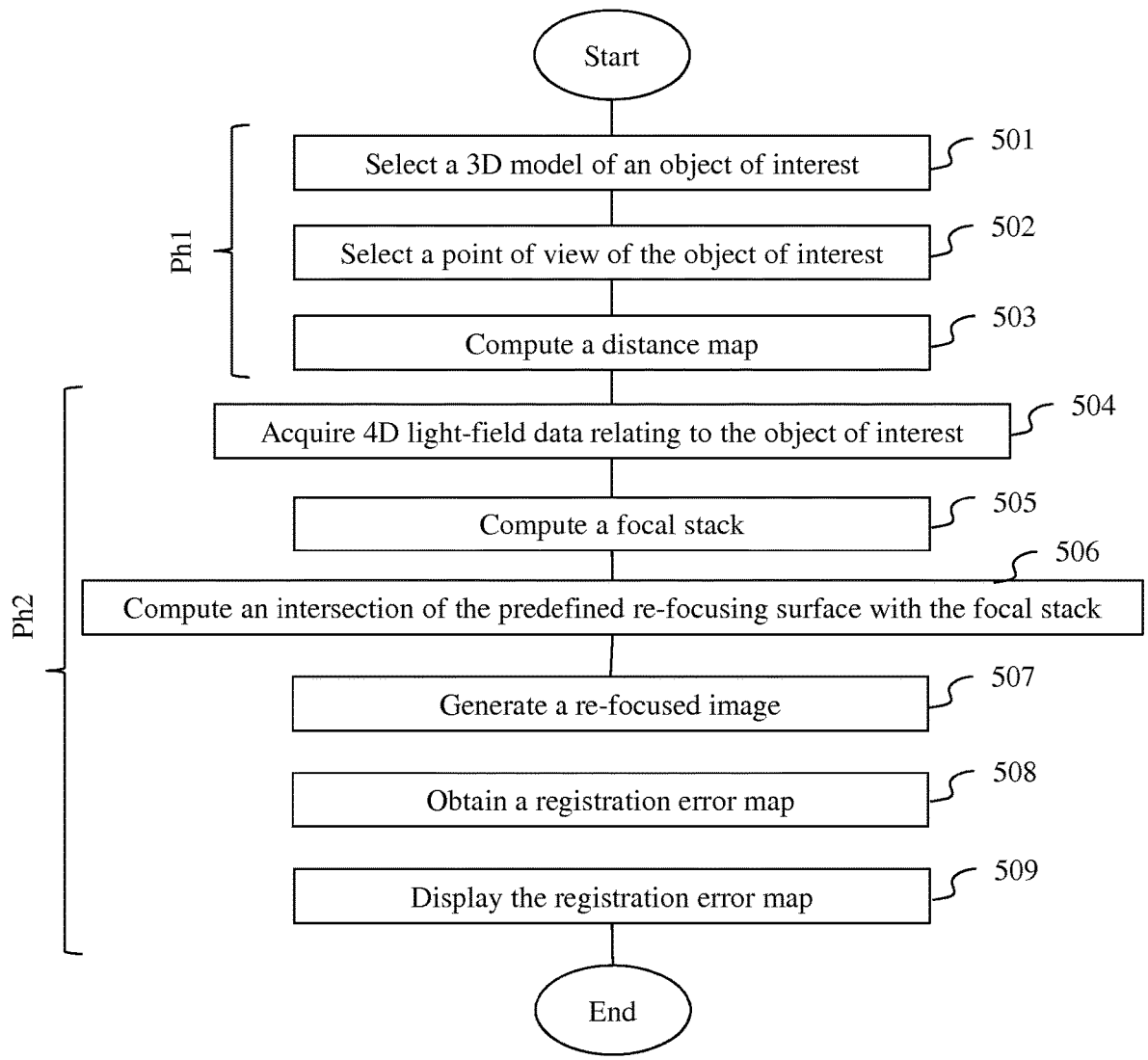
FIG. 5 is a flow chart for explaining a process for obtaining a registration error map representing a level of fuzziness of an image according to an embodiment of the present disclosure.

FIG. 5 is a flow chart for explaining a process for obtaining an error registration map representing a level of fuzziness of an image according to an embodiment of the present disclosure.

In a first phase Ph1 of the process for obtaining an error registration map, a re-focusing surface is determined from a three-dimensional model of an object of interest. The first phase Ph1 comprises steps 501 to 503.

During a step 501, the processor 401 executes a GUI function on the display 404 of the apparatus 400. This GUI function allows a user of the apparatus 400 to select a 3D model of an object of interest from a plurality of 3D models of objects stored in the storage unit 402 of the apparatus 400. User's selection of the 3D model on the GUI on the display 404 can be made by pointing at a 3D model corresponding to the object of interest using a pointing device. In another embodiment of the disclosure, the 3D model of the object of interest is selected automatically for example by decoding a multi-dimensional code associated with an object or a scene. The multi-dimensional code is for example captured by a camera embedded in the apparatus 400 or transmitted from an external apparatus via cable or wireless communication. In that later case, the decoding of the multi-dimensional code can be executed by the external apparatus and the result of the decoding is transmitted to the apparatus 400. The selected 3D model is then stored in the storage unit 402.

Once the 3D model of the object of interest is selected, a point of view of the object is selected in a step 502. In an embodiment of the disclosure, this point of view or reference position, may be specified in the multi-dimensional code associated with the object of interest. In another embodiment of the disclosure, the user of the apparatus 400 may select the point of view himself using for example the pointing device and positioning the 3D model in a position of his choosing. Information related to the selected point of view is then stored in the storage unit 402 of the apparatus 400.

Figure 6:
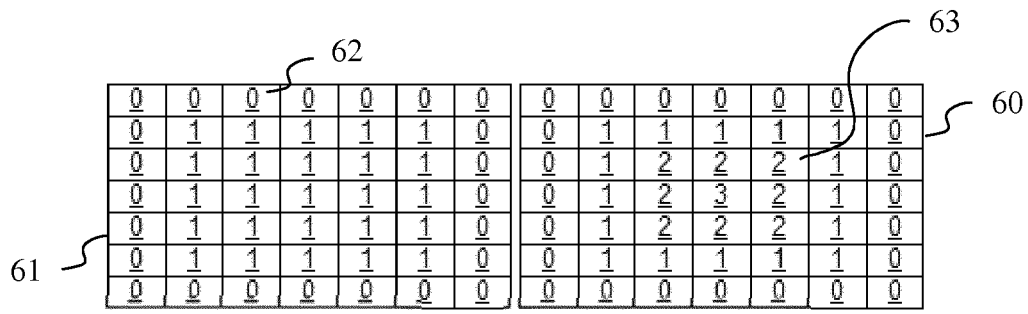
FIG. 6 represents a distance map derived from a digital image.

In a step 503, a distance map of the selected 3D model of the object of interest when set in the reference position is computed. In reference to FIG. 6, a distance map 60, is a derived representation of a digital image 61. The distance map 60 labels each pixel 62 of the digital image 61 with the distance 63 to the nearest obstacle pixel. A most common type of obstacle pixel is a boundary pixel in the binary image 61. The distance map 60 is computed by the processor 401 of the apparatus 400.

Back to FIG. 5, in a second phase Ph2 of the process for obtaining an error registration map, an image of the object of interest is computed based on 4D light-field data related to the object of interest and the re-focusing surface determined during the first phase Ph1 and a registration error map is obtained from this re-focused image. The second phase Ph2 comprises steps 504 to 509.

In a step 504, 4D light-field data relating to the object of interest are acquired by the apparatus 400. In an embodiment of the disclosure, the 4D light-field data are captured by an external apparatus such as a light-field camera. In this embodiment, the 4D light-field data may be input from the light-field camera to the apparatus 400 through the interface unit 405 and then stored in the storage unit 402. In another embodiment of the disclosure, the apparatus 400 embeds a light-field camera. In this case, the 4D light-field data are captured by the light-field camera of the apparatus 400 and then stored in the storage unit 402.

Figure 7:
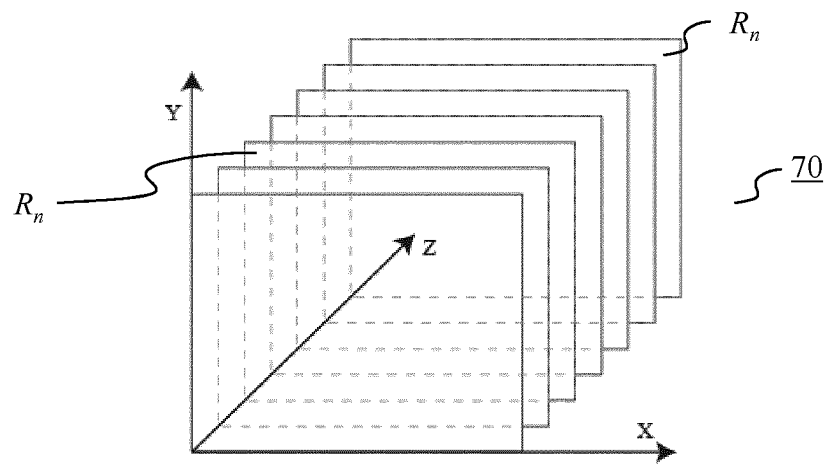
FIG. 7 represents a focal stack computed from acquired 4D light-field data.

In a step 505, a focal stack is computed by the processor 401 from the acquired 4D light-field data relating to the object of interest. In reference to FIG. 7, a focal stack 70 is a collection of N re-focused images $R_n$ (with $n \in [1, N]$) which define a cube of images, where N is a user selected number of images. The N re-focused images are computed for g varying linearly between $g_{min}$ and $g_{max}$ corresponding to a range of focalization distances between $z_{min}$ and $z_{max}$ defined by equations (4) and (8). Another option is to compute the focal stack with w varying linearly from $w_{min}$ and $w_{max}$ corresponding to a range of focalization distances between $z_{min}$ and $z_{max}$ defined by equation (4). The min max boundaries of g or w are defined by the user in order to encompass re-focused images with a focalization distance within $z_{min}$ and $z_{max}$.

The computation of the focal stack 70 described in this embodiment is on the assumption that the 4D light-field data are recorded by a single image sensor with a lens array and optionally a main lens. However, the computation of a focal stack 70 is not limited to 4D light-field data recorded by such type of light-field camera, therefore it should be noted that it is possible to compute a focal stack of re-focused images based on 4D light-field data recorded by any types of light-field cameras.

Back to FIG. 5, in a step 506, the processor 401 computes an intersection of the re-focusing surface determined during the first phase Ph1 and the focal stack 70 computed during step 505.

Figure 8:
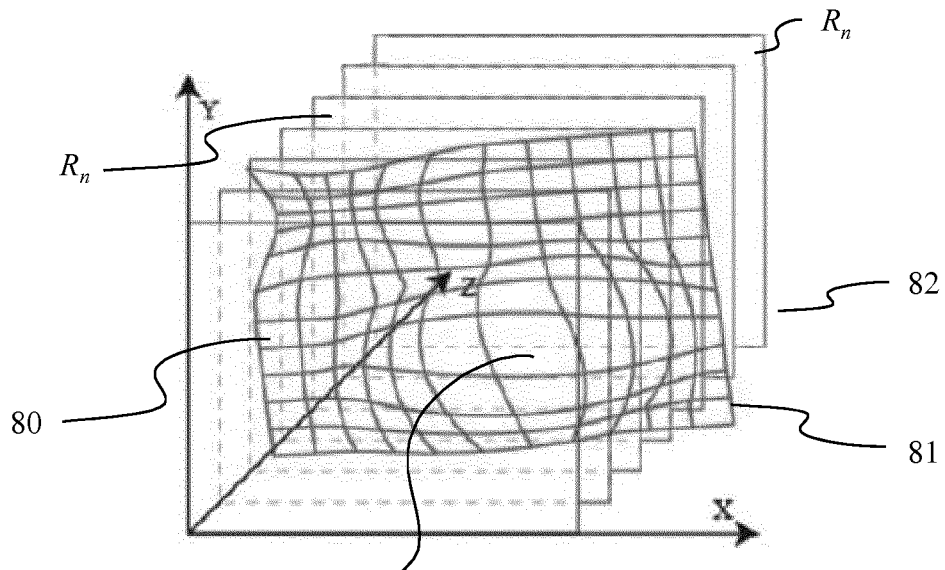
FIG. 8 represents a registration error map obtained by executing the process for obtaining a registration error map representing a level of fuzziness of an image according to an embodiment of the present disclosure.

In reference to FIG. 8, for each pixel 80 of coordinates (x, y) of the image to be re-focused 81, the processor 401 determines, during the step 506, a focalisation distance z from the distance map computed during step 503. Indeed, for each pixel (x, y) of an image, the corresponding distance map associates a distance information Z. Thus, for each pixel (x, y) of the image to be re-focused 81, the focalisation distance z is retrieved from the distance map by consulting the distance information Z associated with the pixel (x, y) of the distance map. The re-focusing distance z corresponds to one of the images $R_n$ constituting the focal stack 82.

Then, back to FIG. 5 in a step 507, the processor 401 generates the re-focused image by combining all the pixels of coordinates (x, y, z) belonging to the intersection of the focal stack with the re-focusing surface.

In a step 608, the processor 401 of the apparatus 400 computes the registration error map. As represented on FIG. 9, a registration error map 90 labels each pixel 91 of a digital image 92 with an information 93 relating to a level a fuzziness of said pixel 92. For example, the information 93 relating to fuzziness may be a value comprised between 0, indicating the highest level of fuzziness, and 1, indicating the highest level of sharpness (or the lowest level of fuzziness), the increment of the value indicating the level of fuzziness of a pixel being for example 0.25. In other words, the value indicating the level of fuzziness of a pixel may take the following values: 0, 0.25, 0.5, 0.75 or 1, the value 0 indicating the highest value of fuzziness and the value 1 indicating the lowest value of fuzziness. Thus, the top-left corner of the image 92 represented on FIG. 9 is sharp since the value of the information 93 representing a level of fuzziness associated with the pixels 91 of the top-left corner of the image 92 is equal to 1. On the contrary, the down-right corner of the image 92 is fuzzy since the value of the information 93 representing a level of fuzziness associated with the pixels 91 of the down-right corner of the image 92 is equal to 0.

Back to FIG. 5, in a step 509, the processor 401 triggers the display on the registration error map on the output device 404 of the apparatus 400. The registration error map displayed on the output device 404 may take different appearances. In an embodiment of the disclosure, the registration error map takes the appearance of the re-focused image itself; that is to say, the end-user of the apparatus 400 sees the re-focused image displayed on the output device 404, some portions of the re-focused image may appeared fuzzy or sharp depending on the value of the information indicating the level of fuzziness of a pixel.

In another embodiment of the disclosure, the registration error map may take the appearance of a bicolour image. For example, if the value of the information relating to fuzziness is 0, then the corresponding pixel will appear red and if the value of the information relating to fuzziness is 1, then the corresponding pixel will appear blue. For a pixel having a value of the information relating to fuzziness between 0 and 1, said pixel appears in a blended shade of reds or a blended shades of blue depending on its level of fuzziness. In this embodiment of the disclosure, the processor 401 of the apparatus 400 determines the colour associated with each pixel of the image based on the value of the information relating to the level of fuzziness, and then generates the appearance of the registration error map to be displayed on the output device 404 of the apparatus 400.

An advantage of the method for obtaining a registration error map as described above is that it relies on the use of 4D light-field data which enable the generation of images refocused on complexes re-focusing surfaces such as 3D surfaces. Once a complex re-focusing surface is determined, a re-focused image is obtained by computing the intersection of the re-focusing surface with a focal stack computed from acquired 4D light-field data. For each pixel of the re-focused image information relating to a level of fuzziness of said pixel is obtained enabling the computation of a registration error map. Since the re-focusing surface is a complex surface, the registration error map reflects that the object of interest is not currently viewed under the right point of view, i.e. the registration error map gives the end-user of the apparatus 400 direct information about how the end-user should shift his point of view around an initial position in regard of the object of interest in order to get a sharp image of the object of interest.

Thus as soon as the apparatus 400 displays a sharp image of the object of interest on the output device 404, or as soon as the registration error map indicates that the pixels corresponding to the object of interest are sharp, the end-user knows the object of interest is viewed under the right point of view.

Such a method offers an easy and user-friendly visual guidance solution.

An application of the method for obtaining a registration error map as described above is the visual guidance of an end-user being either a human being or a robot.

In an embodiment of the disclosure, the end-user is a human being possessing an apparatus 400 embedding a light-field camera such as a tablet.

Visual guidance is useful in situations where the end-user has to be positioned precisely regarding an object of interest such as statue in a museum when a proper positioning regarding the statue triggers the display of information relating to the statue on the output device 404 of the apparatus 400.

First and foremost, a 3D model of the object of interest should be available. For example, such a 3D model of the object of interest may already be stored in the storing unit 402 of the apparatus 400 because the end-user downloaded an application developed by the museum housing the statues for example. In another example, the 3D model of the object of interest is downloaded from a server and stored on the storing unit 402 after a triggering event occurred. Such a triggering event is for example the decoding of a multi-dimensional code relating to the object of interest captured by a camera of the apparatus 400, the multi-dimensional code embedding information such as an URL (Uniform Resource Locator) from which it is possible to download a 3D model of the object of interest.

The first phase Ph1 of the method for obtaining registration error map according to an embodiment of the disclosure is then executed by the processor 401 of the apparatus 400. In an embodiment of the disclosure, the first phase Ph1 of the method for obtaining a registration error map is executed by an external apparatus. The distance map obtain during the first phase Ph1 is then input from the external apparatus to the apparatus 400 through the interface unit 405, and then stored in the storage unit 402.

When 4D light-field data relating to the object of interest are acquired, the second phase Ph2 of the method for obtaining a registration error map according to an embodiment of the disclosure is executed and a registration error map of the object of interest is displayed on the output device 404 of the apparatus 400.

If the registration error map displayed on the output device 404 of the apparatus 400 appears as a blurred image it means that the end-user of the apparatus 400 is not positioned correctly in regard of the object of interest, i.e. the object of interest is not viewed according to the point of view under which the re-focusing surface was determined.

Based on this visual feedback, the end-user shifts his point of view until the registration error map currently displayed on the output device 404 of the apparatus 400 is sharp meaning the object of interest is viewed under the proper point of view, i.e. viewed according to the point of view under which the re-focusing surface was determined.

The intensity and the shape of the fuzziness, or the amount of colours, red or blue indicating a level of fuzziness of the registration error map displayed on the output device 404 help the end-user to determine in which direction he should move the apparatus 400 in order to shift the point of view under which the object of interest is currently viewed.

When the end-user is a robot, the processor 401 may transmit the information relating to a level of fuzziness of the pixels of a digital image to an apparatus controlling the motion of the robot through the interface unit 405 of the apparatus 400.

Based on these information relating to the fuzziness of the pixels of the digital image, the apparatus controlling the motion of the robot may determine in which direction the robot has to move in order to obtain a sharp image of the object of interest.

Besides, a localisation system, such as the GPS (Global Positioning System), or any indoor positioning systems, may be used to help the end-user find the proper position to view the object of interest.

In an embodiment of the disclosure, the fuzziness of the registration error map may be exaggerated on purpose in certain areas of the registration error map in order to increase the visual guidance effect. Thus, based on this visual feedback, the end-user knows in which direction move the apparatus 400 to reach the reference position.

Another application of the method for obtaining a registration error map as described above is the checking of a surface during a quality control process executed by an end-user being either a human being or a robot.

In an embodiment of the disclosure, the end-user is a human being possessing an apparatus 400 embedding a light-field camera such as a tablet.

Re-focusing an image on a re-focusing surface may be useful in situations where the end-user has to check the surface of an object of interest such as a portion of a plane wing for example.

A 3D model of the portion of the plane wing of interest should be available. For example, such a 3D model of portion of the plane wing to be checked may already be stored in the storing unit 402 of the apparatus 400.

The first phase Ph1 of the method for obtaining a registration error map according to an embodiment of the disclosure is then executed by the processor 401 of the apparatus 400. In an embodiment of the disclosure, the first phase Ph1 of the method for generating a registration error map is executed by an external apparatus. The distance map obtain during the first phase Ph1 is then input from the external apparatus to the apparatus 400 through the interface unit 405, and then stored in the storage unit 402.

When 4D light-field data relating to the portion of plane wing to be checked are acquired, the second phase Ph2 of the method for generating a registration error map according to an embodiment of the disclosure is executed and a registration error map of the portion of the plane wing to be checked is displayed on the output device 404 of the apparatus 400.

If the registration error map displayed on the output device 404 of the apparatus 400 appears as a blurred image it means that the surface of the plane wing has defects. Indeed, when the surface of the portion of the plane wing being checked has defects compared to the 3D model of the re-focusing surface which is flawless, then the defects of the surface of the portion of the plane wing being checked are indicated as fuzzy on the registration error map displayed on the output device 404 of the apparatus 400.

In this embodiment, the hypothesis is that the end-user is viewing the portion of the plane wing being checked according to the proper point of view, therefore the fuzziness indicated by the registration error map is due to the defects of the surface of the portion of the plane wing. For example, the end-user may use a localisation system, such as the GPS, or any indoor positioning systems to find the proper position to view the object of interest.

In an embodiment of the disclosure, the fuzziness indicated by the registration error map may be exaggerated on purpose in certain areas of the registration error map in order to make the detection of the defects easier for the end-user.

Although the present disclosure has been described hereinabove with reference to specific embodiments, the present disclosure is not limited to the specific embodiments, and modifications will be apparent to a skilled person in the art which lie within the scope of the present disclosure.

Many further modifications and variations will suggest themselves to those versed in the art upon making reference to the foregoing illustrative embodiments, which are given by way of example only and which are not intended to limit the scope of the disclosure, that being determined solely by the appended claims. In particular the different features from different embodiments may be interchanged, where appropriate.

The invention claimed is:

1. An apparatus comprising:
a processor configured to:
receiving an image having an object of interest;
obtaining a registration error map relating to the image of the object of interest generated by determining a refocusing surface obtained from a distance map of a three-dimensional model of said object of interest when set in a reference position and a focal stack generated from acquired four-dimensional light-field data relating to said object of interest; and
generating a map representing a level of sharpness of at least a plurality of pixels in said image using said registration error map.

2. The apparatus according to claim 1 wherein the processor is configured to compute an intersection of the refocusing surface and the focal stack by determining for each pixel of the image to be re-focused a re-focusing distance corresponding to one of the images constituting the focal stack from the predefined refocusing surface.

3. The apparatus according claim 2, wherein the processor is configured to generate an appearance of the registration error map to be displayed based on information relating to a level of sharpness of the pixels of the re-focused image.

4. The apparatus according to claim 1, wherein the processor is configured to display the obtained registration error map on a display device of the apparatus.

5. A method comprising:
receiving an image having an object of interest;
obtaining a registration error map relating to the image of the object of interest generated by determining a refocusing surface obtained from a distance map of a three-dimensional model of said object of interest when set in a reference position and a focal stack generated from acquired four-dimensional light-field data relating to said object of interest; and
generating a map representing a level of sharpness of at least a plurality of pixels in said image using said registration error map.

6. The method according to claim 5 wherein determining an intersection of the distance map and the focal stack comprises determining for each pixel of the image to be re-focused a re-focusing distance corresponding to one of the images constituting the focal stack from the re-focusing surface.

7. The method according to claim 6 further comprising generating an appearance of the registration error map to be displayed based on information relating to a level of sharpness of the pixels of the re-focused image.

8. The method according to any one of claim 7 comprising displaying the obtained registration error map on a display device.

9. A computer program characterized in that it comprises program code instructions for the implementation of the method for obtaining a registration error map representing a level of sharpness of an image according to claim 5 when the program is executed by a processor.

10. A processor readable medium having stored therein instructions for causing a processor to perform the method for obtaining a registration error map representing a level of sharpness of an image according to claim 5.

11. Non-transitory storage medium carrying instructions of program code for executing the method for obtaining a registration error map representing a level of sharpness of an image according to claim 5, when said program is executed on a determining device, shifting the point of view of said four-dimensional light-field data relating to said object of interest until the pixels of an image of an object of interest are sharp.

* * * * *